(12) United States Patent
Humphrey

(10) Patent No.: US 7,978,588 B2
(45) Date of Patent: Jul. 12, 2011

(54) OPTICAL DATA READING/WRITING WITH STATIONARY DISH MIRROR

(76) Inventor: David Humphrey, Winnetka, IL (US)

( * ) Notice: Subject to any disclaimer, the term of this patent is extended or adjusted under 35 U.S.C. 154(b) by 205 days.

(21) Appl. No.: 12/455,368

(22) Filed: Jun. 1, 2009

(65) Prior Publication Data

US 2009/0303859 A1 Dec. 10, 2009

Related U.S. Application Data

(60) Provisional application No. 61/058,765, filed on Jun. 4, 2008.

(51) Int. Cl.
*G11B 7/00* (2006.01)

(52) U.S. Cl. .................................. 369/112.29

(58) Field of Classification Search .............. 369/112.19
See application file for complete search history.

(56) References Cited

U.S. PATENT DOCUMENTS

| | | | |
|---|---|---|---|
| 3,549,897 A | 12/1970 | Blake | |
| 3,602,571 A * | 8/1971 | Norris, Jr. | 359/203.1 |
| 4,495,609 A | 1/1985 | Russell | |
| 4,838,632 A * | 6/1989 | Manian | 359/221.1 |
| 5,128,820 A | 7/1992 | Bronsvatch | |
| 5,136,559 A | 8/1992 | Nakayama | |
| 5,172,282 A | 12/1992 | Ghose | |
| 6,278,682 B1 | 8/2001 | Takishima et al. | |
| 6,766,958 B1 | 7/2004 | Roh | |
| 6,912,183 B2 | 6/2005 | Ma et al. | |
| 6,956,796 B2 | 10/2005 | Ma et al. | |
| 7,339,710 B2 | 3/2008 | Chuang | |
| 7,420,893 B2 * | 9/2008 | Bryan | 369/44.23 |
| 2003/0189888 A1 | 10/2003 | Hou | |
| 2004/0004914 A1 | 1/2004 | Ceshkovsky | |
| 2005/0270609 A1 | 12/2005 | Chuang et al. | |

* cited by examiner

*Primary Examiner* — Aristotelis Psitos
(74) *Attorney, Agent, or Firm* — Husch Blackwell LLP

(57) ABSTRACT

Apparatus and method for reading data from or writing data to a stationary optical storage medium. A light beam redirecting mechanism is rotatable about an axis through a stationary dish mirror that faces a stationary optical storage medium from which data may be read or to which data may be written.

20 Claims, 6 Drawing Sheets

US 7,978,588 B2

OPTICAL DATA READING/WRITING WITH STATIONARY DISH MIRROR

This invention pertains to reading or writing optical data from or to a stationary optical storage medium, and claims the benefit of the filing date of U.S. provisional application Ser. No. 61/058,765 that was filed on 4 Jun. 2008.

BACKGROUND

It is well-known in the art to retrieve, and sometimes to store, data using laser light or electromagnetic waves near the light spectrum as part of the process. This is common in CD players, in DVD players and DVD recorders, and in computers. For example, a typical optical disc drive for reading data stored on an optical disc includes a light emitter such as a semiconductor laser, photodiodes for detecting the light reflected from the disc's surface, and means for directing light beams to and receiving them back from particular points on the surface of the disc. As examples, CD lasers are common with an infrared wavelength of about 780 nm. DVDs commonly use a red wavelength of about 650 nm. Blu-Ray Discs commonly use a violet wavelength of about 405 nm. All electromagnetic waves used to store data on or retrieve data from an optical storage medium are referred to herein as light beams.

As an example of how the data is stored, depressions are made at particular points on the surface of a disc to depths amounting to particular fractions of a wavelength. When retrieving the data, the reflected light beam's phase is shifted with respect to the phase of the incoming light beam, and the mutual interference affects the intensity of the reflected light beam and, correspondingly, the electrical signals output from the photodiodes. As another example of how data is stored, particular points of a dye layer on a disc are selectively heated with a laser light beam, changing the reflectivity of the dye and, correspondingly, the intensity of the reflected light beams and resulting electrical signals from the photodiodes when data is being retrieved. As another example of how data is stored, the intensity and timing of a laser light beam applied to particular points of a crystalline metal alloy layer on a disc affect their form (e.g. crystalline or amorphous) and reflectivity.

The means mentioned above for directing light beams to and receiving them back from particular points on the surface of an optical storage medium may include software and electrical, mechanical and optical components.

BRIEF DESCRIPTION OF THE DRAWINGS

The following drawings are diagrams illustrating the concepts of the present invention and do not necessarily represent the actual appearances of components and are not necessarily to scale.

DETAILED DESCRIPTION OF SOME EMBODIMENTS

Figure 1:
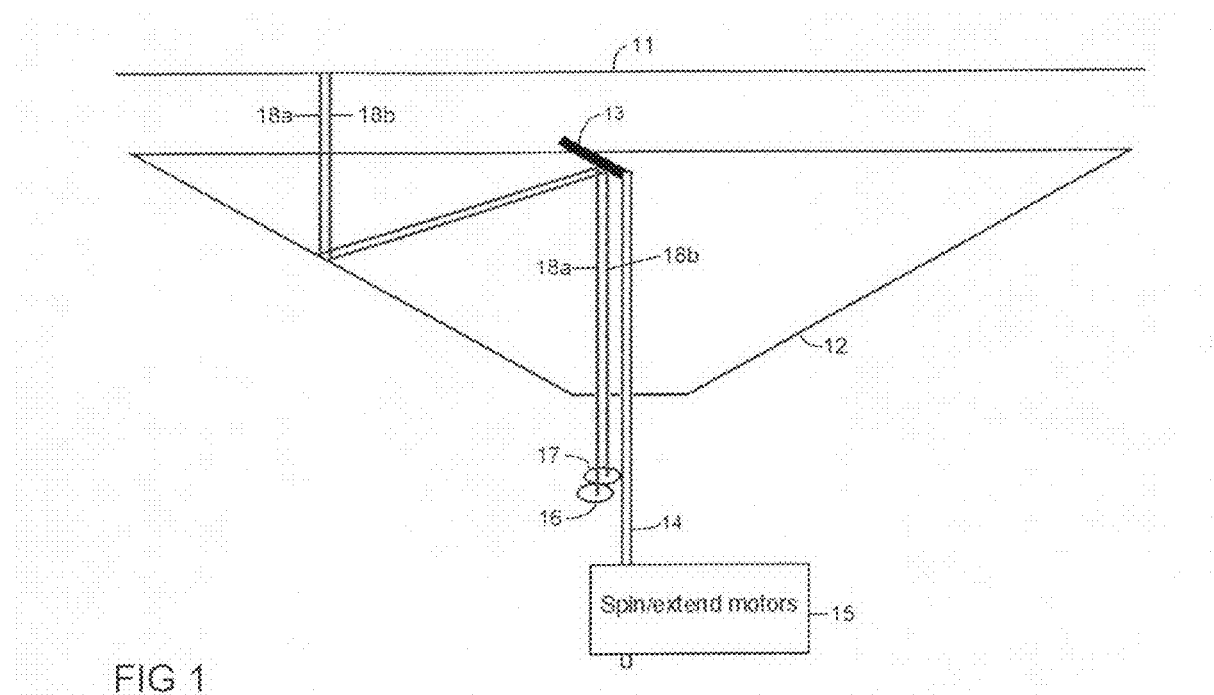
FIG. 1 is a diagram illustrating an exemplary embodiment.

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated or described.

1. FIG. 1 is a diagram illustrating an exemplary embodiment for reading data from, and possibly writing data to, a stationary optical storage medium 11 such as a CD or a DVD. In this example, a stationary dish mirror 12 is a conical mirror that is structured and dimensioned to face an opposing surface of the storage medium 11. "Conical mirror" is used herein to mean a mirror shaped like the concave side of the curved surface of a cone, or at least a truncated cone. An emitter 16, such as a semiconductor laser, and a reader 17, such as photodiodes, respectively direct light beams to and receive light beams from a light beam redirecting mechanism comprising a light beam redirecting component such as a mirror or a lens. In this example, that mechanism comprises a small spindle mirror 13 mounted on a rotating spindle 14 that extends and retracts. Motors 15 control the rotation and the extension/retraction of spindle 14. In this example, the spindle mirror 13 is fixed at a particular angle relative to an axis of the spindle 14, and the emitter 16 and the reader 17 rotate with the spindle 14 and are aimed at the spindle mirror 13. However, as illustrated in FIGS. 2-4 and 6 in connection with other embodiments, the emitter 16 and/or the reader 17 can be arranged so that light beams from the emitter 16 to the spindle mirror 13 and from the spindle mirror 13 to the reader 17 travel longitudinally inside of the spindle 14. In that case, the emitter 16 and/or the reader 17 can be stationary rather than rotating with the spindle 14.

In the example of FIG. 1, a light beam 18a from the emitter 16 reflects off the spindle mirror 13 to a point on the stationary mirror 12 from which it reflects to a point on the storage medium 11. In reading data stored at a particular point on the storage medium 11, a light beam 18b reflecting back from that point on the storage medium 11 reflects off a point on the stationary mirror 12 to the spindle mirror 13 from which it reflects to the reader 17. In the example of FIG. 1, the emitter 16, the reader 17 and the motors 15 are shown on the opposite side of the stationary mirror 12 as the storage medium 11 is shown, and the stationary mirror 12 is structured to allow the spindle 14 and the light beams 18a and 18b to pass through it. In other examples, the emitter 16, the reader 17, and/or any of the motors 15 could be located elsewhere, such as on the same side of the stationary mirror 12 as the storage medium 11 is located.

In the example of FIG. 1, pathways for all light beams 18a are the same between the emitter 16 and the spindle mirror 13, and pathways for all light beams 18b are the same between the spindle mirror 13 and the reader 17. However, a particular point on the stationary mirror 12 and a particular point on the storage medium 11 where a particular light beam reflects depends on a length of the extension and on the angular orientation of the spindle 14. The extension and angular orientation of the spindle 14 are controlled by the motors 15. The control of the motors 15 and correlation with particular points on storage medium 11 are accomplished by electronic circuitry and computer programming as is known in the art of optical disc drives. The manufacture of conical mirrors and other mirrors discussed in connection with other embodiments is known in the art of optical instruments.

In this example, the storage medium 11 and the stationary mirror 12 both remain stationary, and there is a point to point correlation between points on the stationary mirror 12 from which light beams will be reflected to points on the storage medium 11, and vice versa. As compared with optical disc drives that are commercially available, this results in a more stable, less delicate and heavier duty machine that exhibits less vibration and is less susceptible to the errors that arise with precision components that are moving. It also results in less power consumption, and cooler, quieter and quicker searching.

Figure 2:
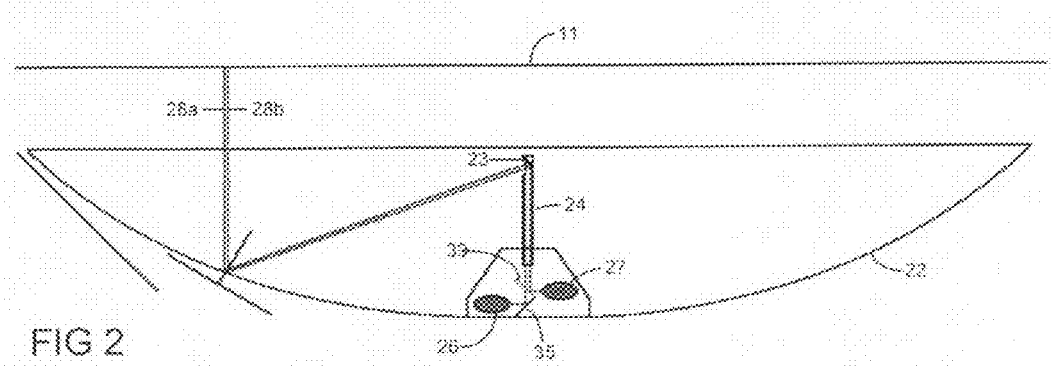
FIG. 2 is a diagram illustrating another exemplary embodiment.

2. FIG. 2 is a diagram illustrating another exemplary embodiment that is similar to the example of FIG. 1 with the differences discussed below. In this example, a stationary dish mirror 22 is a parabolic mirror, so that all light beams parallel to the axis of the parabolic mirror 22 are reflected through a single focal point, and all light beams from the focal point are reflected parallel to the axis of the parabolic mirror 22. Consequently, light beams can be directed to and received from points on the parabolic mirror 22 of varying radial distance from the axis of the parabolic mirror 22 by adjusting an angle of a small spindle mirror 23 relative to the axis of a rotating spindle 24, where the spindle mirror 23 is located at the focal point of the parabolic mirror 22 and rotates with the spindle 24. The angle of the spindle mirror 23 relative to the axis of the spindle 24 can be adjusted via a mechanical linkage rotating with the spindle 24 or via other means such as magnetic linkages like the ones discussed below in connection with FIGS. 8-10. Therefore, the spindle 24 does not have to extend and retract. A particular point on the parabolic mirror 22 and a particular point on the storage medium 11 where a particular light beam reflects depends on the angular orientation of the spindle 24 and on the angle of the spindle mirror 23 relative to the axis of the spindle 24.

Figure 3:
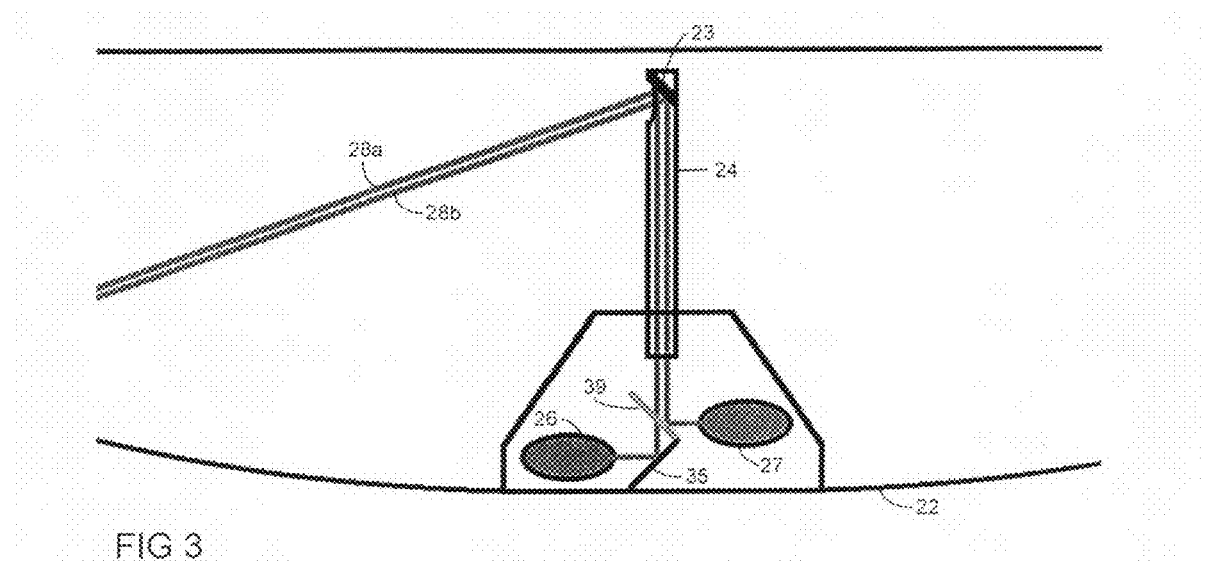
FIG. 3 is an enlarged diagram showing a central portion of FIG. 2.

FIG. 3 is an enlarged diagram showing a central portion of FIG. 2. In this example, a light beam 28a from an emitter 26 reflects off a flat mirror 35, travels through a one-way mirror 39, and travels longitudinally inside the rotating spindle 24 to the spindle mirror 23 that rotates with the spindle 24. A returning light beam 28b reflects off the spindle mirror 23, travels longitudinally inside the spindle 24, and reflects off the one-way mirror 39 to a reader 27.

Figure 4:
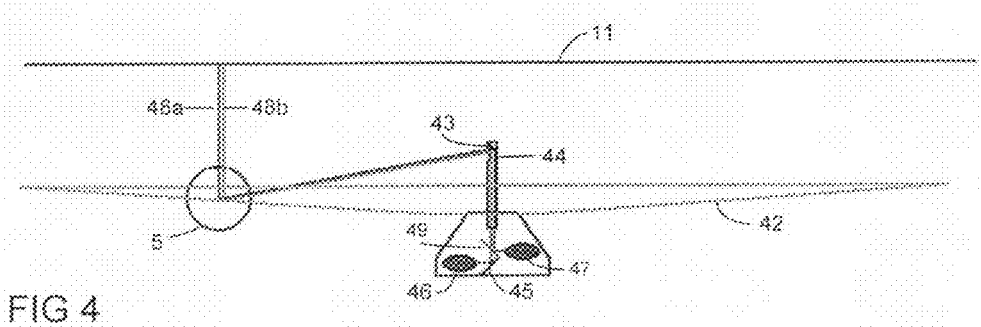
FIG. 4 is a diagram illustrating another exemplary embodiment.
Figure 5:
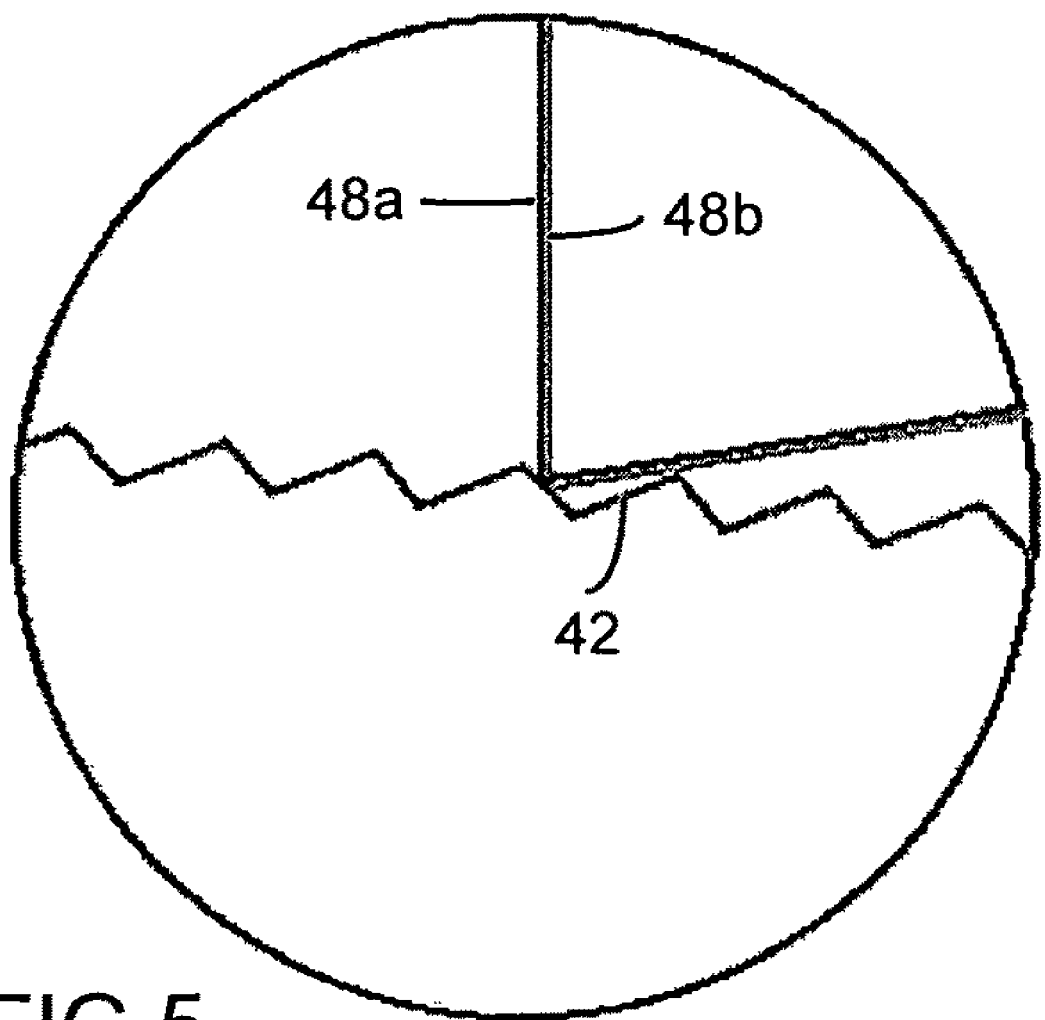
FIG. 5 is an enlarged diagram showing a portion of a collapsed dish mirror such as is shown in FIG. 4.

3. FIG. 4 is a diagram illustrating another exemplary embodiment, and FIG. 5 is an enlarged diagram showing a portion of a collapsed dish mirror such as is shown in FIG. 4. As with the examples of FIGS. 1 and 2, there is a small spindle mirror 43 that rotates with a spindle 44. As in FIGS. 2 and 3, FIG. 4 illustrates an emitter 46 and a reader 47 arranged with a flat mirror 45 and a one-way mirror 49 to direct and receive light beams 48a and 48b to and from the spindle mirror 43 that travel longitudinally inside the spindle 44. However, as in FIG. 1, the emitter 46 and the reader 47 are shown on the opposite side of the stationary mirror 42 as the storage medium 11 is shown, and the stationary mirror 42 is structured to allow the spindle 44 to pass through it.

In the examples of FIGS. 4 and 5, the stationary mirror 42 is a collapsed dish mirror, that may require less volume than the examples illustrated in FIGS. 1 and 2. That is, instead of comprising only a single continuously smooth reflecting surface, the stationary mirror 42 comprises a series of concentric reflecting rings, each of which comprises a separate continuously smooth reflecting surface.

There are a number of variations for constructing the stationary mirror 42 in combination with a mechanism for redirecting the light beams 48a and 48b to and from the stationary mirror 42. For example, the concentric reflecting rings of the stationary mirror 42 can be conical mirrors or they can be parabolic mirrors. In addition, if outer concentric reflecting rings are raised relative to inner concentric reflecting rings as shown in FIG. 4, then the spindle 44 will not have to be as high for light beams to clear inner concentric reflecting rings. Correspondingly, outer concentric reflecting rings can be raised less or possibly not at all relative to inner concentric reflecting rings, if the spindle 44 is higher.

As additional examples, the collapsed dish mirror 42 can be constructed to be compatible with a light beam redirecting mechanism as in the embodiment of FIG. 1, as in the embodiment of FIGS. 2 and 3, or as in an embodiment combining features of the other embodiments. That is, the rotating spindle 44 can extend and retract with the spindle mirror 43 being fixed at a particular angle relative to an axis of the spindle 44, the rotating spindle 44 can remain at a fixed height with the angle of the spindle mirror 43 being adjustable relative to the axis of the spindle 44, or both the height of the spindle 44 and the angle of the spindle mirror 43 relative to the axis of the spindle 44 can be adjustable.

The concentric reflecting rings of the stationary collapsed dish mirror 42 need not be parabolic mirrors, even if the angle of the spindle mirror 43 is adjustable. They may be conical mirrors, though successive rings moving outward would be at decreasing angles relative to an axis of the stationary mirror 42.

Figure 6:
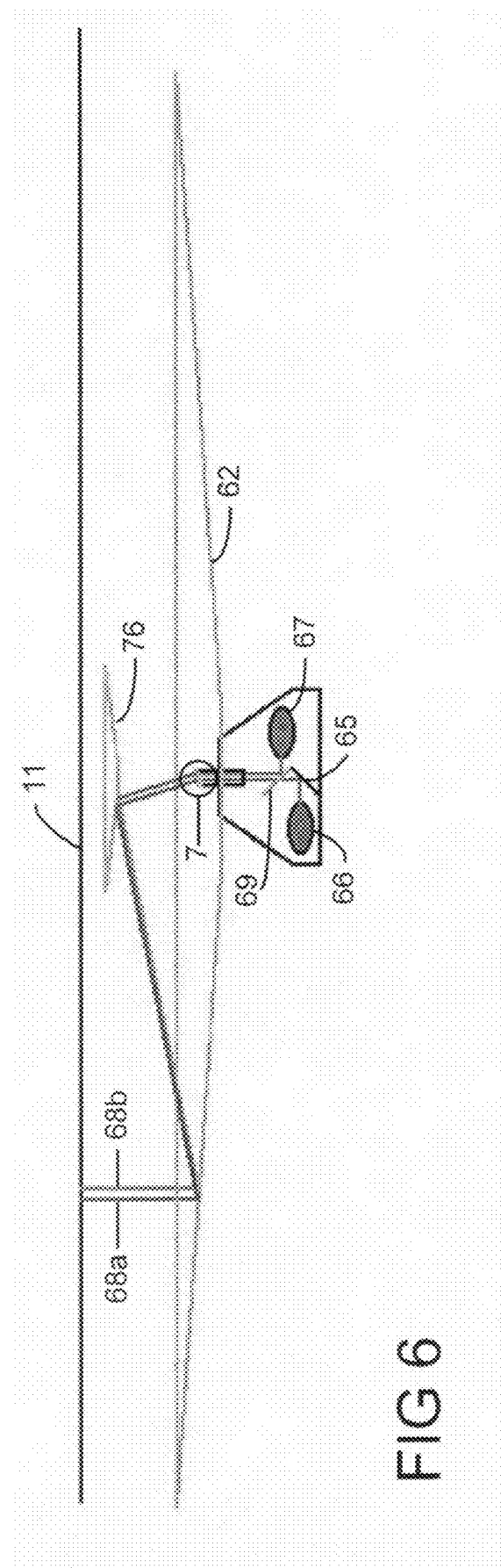
FIG. 6 is a diagram illustrating another exemplary embodiment.
Figure 7:
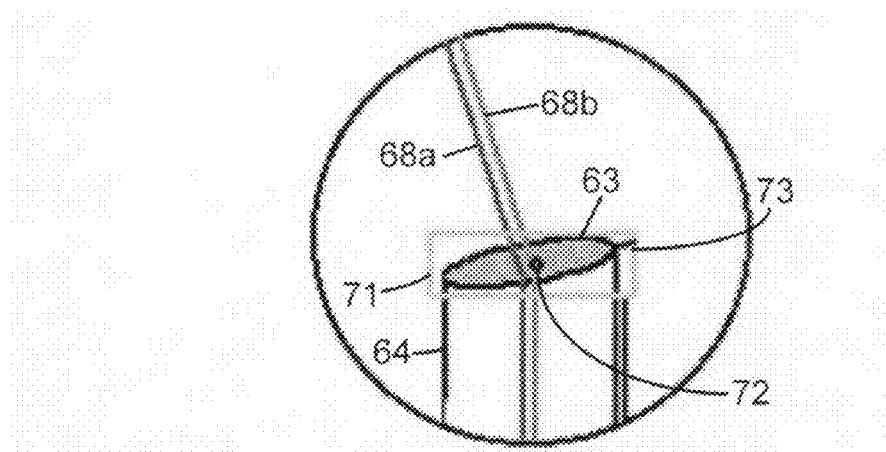
FIG. 7 is an enlarged diagram showing a lens such as is shown in FIG. 6.

4. FIG. 6 is a diagram illustrating another exemplary embodiment. As in the example of FIG. 4, FIG. 6 illustrates a stationary collapsed dish mirror 62. As in the example of FIG. 4, FIG. 6 illustrates an emitter 66 and a reader 67 arranged with a flat mirror 65 and a one-way mirror 69 to direct and receive light beams 68a and 68b that travel longitudinally inside a rotating spindle 64. However, in the example of FIG. 6, those light beams are redirected by a lens 63 rotating with the spindle 64 and by an additional stationary convex mirror 76. FIG. 7 is an enlarged diagram showing a lens 63 such as is shown in FIG. 6. A light beam 68a is redirected by lens 63 to a point on the convex mirror 76, from which it is reflected to a point on the stationary mirror 62, from which it is reflected to a point on the storage medium 11. In reading data stored at a particular point on the storage medium 11, a light beam 68b reflecting back from that point on the storage medium 11 reflects off a point on the stationary mirror 62 to a point on the convex mirror 76, from which it reflects to lens 63 where it is redirected.

As an example, the convex mirror 76 can be a collapsed mirror with concentric rings, each concentric ring of the convex mirror 76 being aimed at a corresponding concentric reflecting ring of the collapsed dish mirror 62. For example, each concentric ring of the convex mirror 76 may be shaped like the convex side of the curved surface of a truncated cone.

In the example of FIG. 6, an angle of the lens 63 relative to an axis of the spindle 64 is adjustable in order to redirect light beams to or from points on the convex mirror 76 at different radial distances from an axis of the convex mirror 76. A particular point on the convex mirror 76, a particular point on the stationary mirror 62, and a particular point on the storage medium 11 where a particular light beam reflects depends on the angular orientation of the spindle 64 and on the angle of the lens 63 relative to the axis of the spindle 64.

Figure 8:
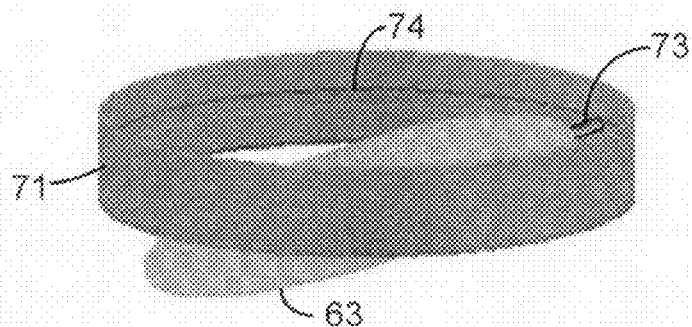
FIG. 8 is a diagram showing an example of a relationship between a lens and a collar for adjusting an angle of the lens such as in the embodiment of FIGS. 6 and 7.
Figure 9:
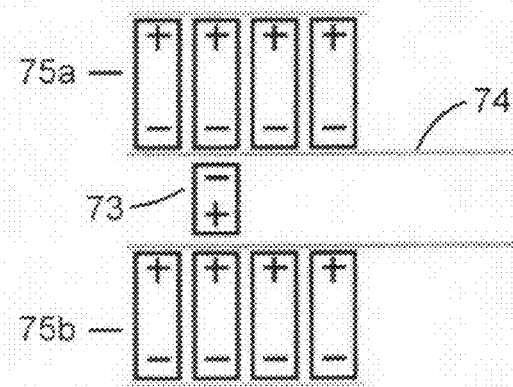
FIG. 9 is a diagram showing an arrangement of magnets in the example of FIG. 8.

As discussed above in connection with adjustment of the angle of the spindle mirror 23 in FIG. 2, the angle of the lens 63 relative to the axis of the spindle 64 can be adjusted by various means. One example is a mechanical linkage rotating with the spindle 64. FIGS. 8 and 9 illustrate another example of how to adjust the angle of the lens 63 relative to the axis of the spindle 64 in an embodiment such as is illustrated by FIGS. 6 and 7. In the example of FIGS. 8 and 9, the angle of the lens 63 relative to the axis of the spindle 64 is adjusted by pivoting lens 63 about two rods 72 that are attached to the spindle 64 and act as a hinge. A collar 71 encircles the spindle 64 but need not rotate with the spindle 64. As illustrated in FIG. 8, the collar 71 comprises an indented channel 74, and a pin 73 is attached to the edge of the lens 63 at a point that is generally equidistant from each of the two rods 72. The pin 73 fits into the channel 74 without touching the collar 71, even as the angle of the lens 63 relative to the axis of the spindle 64 is adjusted. As illustrated in FIG. 9, the collar 71 comprises a plurality of magnets arranged in a row 75a above the channel 74 and in a row 75b below the channel 74. All of the magnets are oriented vertically in the same direction, such as with the positive pole on top and the negative pole on the bottom. The pin 73 comprises a magnet that is oriented in the opposite direction as the magnets in rows 75a and 75b. The negative-to-negative repulsing and the positive-to-positive repulsing keep the pin 73 from touching the walls of the channel 74. The angle of the lens 63 relative to the axis of the spindle 64 is adjusted by moving the collar 71 longitudinally along the axis of the spindle 64.

Figure 10:
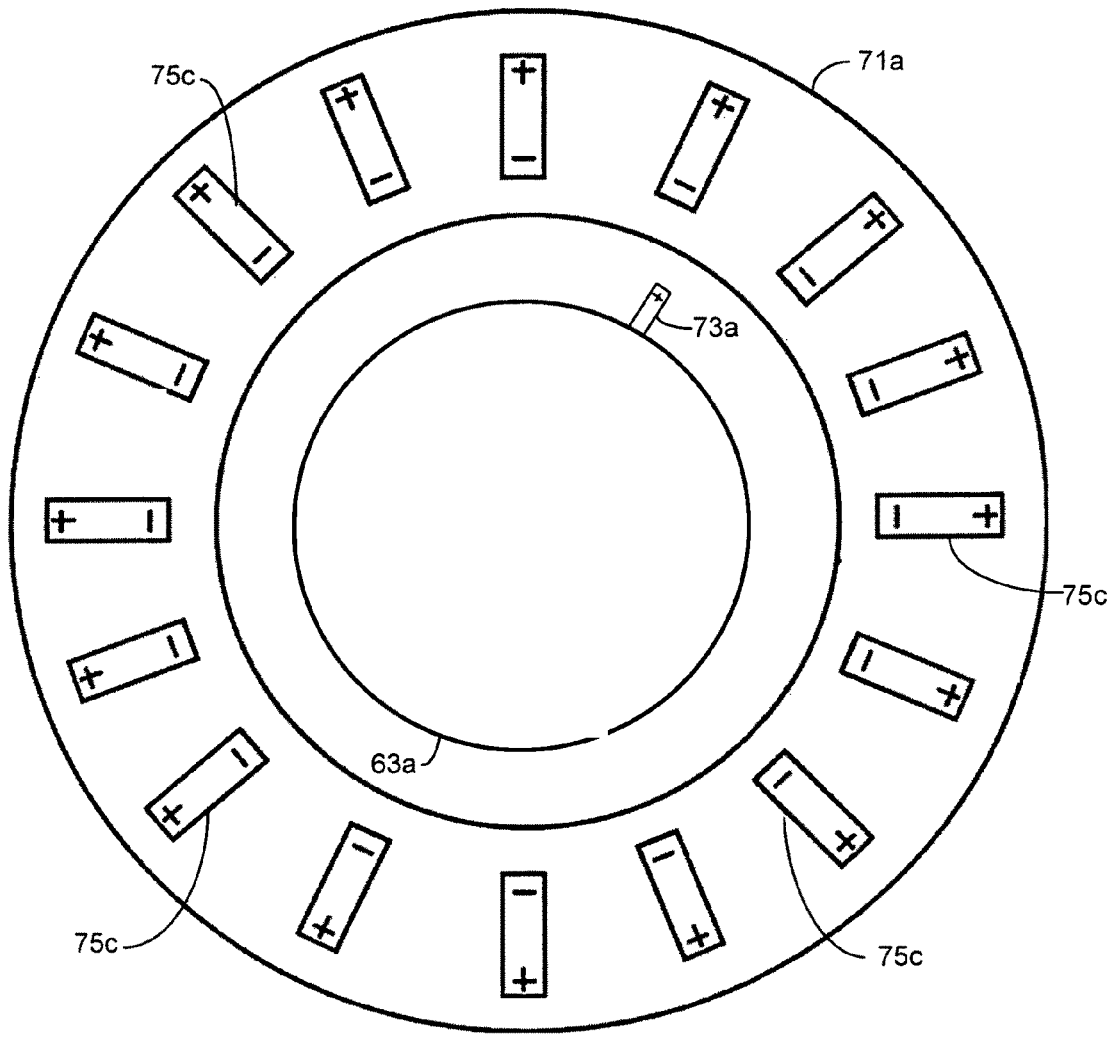
FIG. 10 is a diagram showing another example of a relationship between a lens and a collar for adjusting an angle of the lens such as in the embodiment of FIGS. 6 and 7.

FIG. 10 illustrates another example of how to adjust the angle of a lens 63a relative to the axis of the spindle 64 in an embodiment such as is illustrated by FIGS. 6 and 7. In the example of FIG. 10, a collar 71a need not comprise any indented channel, but comprises a plurality of magnets 75c oriented radially in the same direction, such as with the positive pole on the outside and the negative pole on the inside. A pin 73a is attached to the edge of the lens 63a at a point that is generally equidistant from each of the two rods 72, and comprises a magnet that is oriented in the same direction as the magnets 75c. The positive-to-negative attraction keeps the pin 73a pointing towards the collar 71a, and the angle of the lens 63a relative to the axis of the spindle 64 is adjusted by moving the collar 71a longitudinally along the axis of the spindle 64.

5. In each of the examples discussed above, an optical storage medium 11 remains stationary and there is a stationary dish mirror structured and dimensioned to face an opposing surface of the stationary optical storage medium 11. Various features of different examples are disclosed and some may be interchanged and used in different examples than the examples with which they were discussed. However, the only components that were necessarily rotatable in every example were a spindle and either a spindle mirror or a lens attached to the spindle. A diameter and a mass of the rotating spindle and its attached mirror or lens can be much smaller than a diameter and a mass of the optical storage medium 11, so much greater rotational rates are feasible as compared with optical disc drives that are commercially available. In some cases, the operational speed may exceed the processor speed of computers rendering the disclosed devices and methods suitable for use in computers. A computer operating system and some of the hardware functions could be encoded on an optical storage medium. In that case, an operating system could be exchanged at will, effectively providing a new computer even between platforms.

From the foregoing, it will be observed that numerous modifications and variations can be effectuated without departing from the true spirit and scope of the novel concepts of the present invention. It is to be understood that no limitation with respect to the specific embodiments illustrated or described is intended or should be inferred.

What is claimed is:

1. An optical data storage apparatus comprising:
a stationary optical storage medium;
a stationary dish mirror structured and dimensioned to face an opposing surface of the stationary optical storage medium;
a light beam redirecting mechanism that is rotatable about an axis through the stationary dish mirror;
wherein light beams can be directed to and reflected back from particular points on the stationary optical storage medium via the light beam redirecting mechanism and the stationary dish mirror.

2. The apparatus of claim 1 wherein,
the stationary dish mirror is selected from a group consisting of a conical mirror, a parabolic mirror, and a collapsed dish mirror;
the collapsed dish mirror comprising a series of concentric reflecting rings.

3. The apparatus of claim 1,
the light beam redirecting mechanism comprising a rotatable spindle and a light beam redirecting component attached to and rotatable with the spindle about the axis through the stationary dish mirror;
the spindle being extendable and retractable longitudinally along the axis through the stationary dish mirror;
wherein a particular point on the stationary optical storage medium where a particular light beam is directed depends on a length of extension of the spindle and on an angular orientation of the spindle about the axis through the stationary dish mirror.

4. The apparatus of claim 1,
the light beam redirecting mechanism comprising a rotatable spindle and a spindle mirror attached to and rotatable with the spindle about the axis through the stationary dish mirror;
an angle of the spindle mirror relative to the axis through the stationary dish mirror being adjustable;
wherein a particular point on the stationary optical storage medium where a particular light beam is directed depends on an angular orientation of the spindle about the axis through the stationary dish mirror and on the angle of the spindle mirror relative to the axis through the stationary dish mirror.

5. The apparatus of claim 1,
the light beam redirecting mechanism comprising a rotatable spindle and a lens attached to and rotatable with the spindle about the axis through the stationary dish mirror;
an angle of the lens relative to the axis through the stationary dish mirror being adjustable;
wherein a particular point on the stationary optical storage medium where a particular light beam is directed depends on an angular orientation of the spindle about the axis through the stationary dish mirror and on the angle of the lens relative to the axis through the stationary dish mirror.

6. The apparatus of claim 1, further comprising:
a stationary convex mirror;
wherein the light beams may be directed to the particular points on the stationary optical storage medium via the light beam redirecting mechanism, the stationary convex mirror, and the stationary dish mirror.

7. The apparatus of claim 6,
the stationary convex mirror comprising a collapsed mirror comprising a series of concentric rings;
the stationary dish mirror comprising a collapsed dish mirror comprising a series of concentric reflecting rings;
each of the concentric rings of the stationary convex mirror being aimed at a corresponding concentric reflecting ring of the stationary dish mirror.

8. The apparatus of claim 1,
the light beam redirecting mechanism comprising a rotatable spindle and a light beam redirecting component attached to and rotatable with the spindle about the axis through the stationary dish mirror;
wherein at least a portion of optical pathways for the light beams comprises travelling longitudinally inside of the spindle.

9. The apparatus of claim 1, further comprising:
a collar comprising an inside ring surface;
the light beam redirecting mechanism comprising a rotatable spindle and a light beam redirecting component attached to and rotatable with the spindle about the axis through the stationary dish mirror;
the inside ring surface of the collar being concentric with the spindle and longitudinally adjustable along the axis through the stationary dish mirror;
the collar comprising a plurality of collar magnets;
each of the collar magnets being oriented radially with a same one of its positive and negative magnetic poles being positioned near the inside ring surface, and with a same opposite one of its positive and negative magnetic poles being positioned away from the inside ring surface;
the light beam redirecting component being pivotally attached to the spindle to permit adjustment of an angle of the light beam redirecting component relative the axis through the stationary dish mirror;
the light beam redirecting component comprising a pin magnet;
the pin magnet being positioned so that the opposite one of its positive and negative magnetic poles is closest to the inside ring surface of the collar and can be attracted by at least one of the collar magnets;
wherein an angle of the light beam redirecting component relative to the axis through the stationary dish mirror can be adjusted by longitudinal adjustment of the collar along the axis through the stationary dish mirror.

10. The apparatus of claim 1, further comprising:
a collar comprising an indented channel;
the light beam redirecting mechanism comprising a rotatable spindle and a light beam redirecting component attached to and rotatable with the spindle about the axis through the stationary dish mirror;
the collar being concentric with the spindle and longitudinally adjustable along the axis through the stationary dish mirror;
the collar comprising a first row of collar magnets above the indented channel and a second row of collar magnets below the indented channel;
each of the collar magnets being oriented longitudinally along the axis through the stationary dish mirror, with a same one of its positive and negative magnetic poles being positioned higher along the axis, and with a same opposite one of its positive and negative magnetic poles being positioned lower along the axis;
the light beam redirecting component being pivotally attached to the spindle to permit adjustment of an angle of the light beam redirecting component relative the axis through the stationary dish mirror;
the light beam redirecting component comprising a pin magnet;
the pin magnet being positioned in the indented channel of the collar;
the pin magnet being positioned with an opposite magnetic orientation as the collar magnets, so that the opposite one of its positive and negative magnetic poles is positioned higher along the axis through the stationary dish mirror, wherein each of its magnetic poles is being repelled by a nearest collar magnet and the pin magnet is kept from touching a top surface and a bottom surface of the indented channel as the collar is adjusted longitudinally along the axis through the stationary dish mirror;
wherein an angle of the light beam redirecting component relative to the axis through the stationary dish mirror can be adjusted by longitudinal adjustment of the collar along the axis through the stationary dish mirror.

11. A method of providing an optical data storage apparatus, the method comprising:
providing a stationary optical storage medium;
providing a stationary dish mirror structured and dimensioned to face an opposing surface of the stationary optical storage medium;
providing a light beam redirecting mechanism that is rotatable about an axis through the stationary dish mirror;
arranging optical pathways so that light beams can be directed to and reflected back from particular points on the stationary optical storage medium via the light beam redirecting mechanism and the stationary dish mirror.

12. The method of claim 11 wherein,
the stationary dish mirror is selected from a group consisting of a conical mirror, a parabolic mirror, and a collapsed dish mirror;
the collapsed dish mirror comprising a series of concentric reflecting rings.

13. The method of claim 11 wherein,
the light beam redirecting mechanism comprises a rotatable spindle and a light beam redirecting component attached to and rotatable with the spindle about the axis through the stationary dish mirror;
the light beam redirecting component being selected from a group consisting of a mirror and a lens.

14. The method of claim 11,
the light beam redirecting mechanism comprising a rotatable spindle and a light beam redirecting component attached to and rotatable with the spindle about the axis through the stationary dish mirror;
the spindle being extendable and retractable longitudinally along the axis through the stationary dish mirror;
the method further comprising arranging the optical pathways so that a particular point on the stationary optical storage medium where a particular light beam is directed depends on a length of extension of the spindle and on an angular orientation of the spindle about the axis through the stationary dish mirror.

15. The method of claim 11,
the light beam redirecting mechanism comprising a rotatable spindle and a light beam redirecting component attached to and rotatable with the spindle about the axis through the stationary dish mirror;
an angle of the light beam redirecting component relative to the axis through the stationary dish mirror being adjustable;
the method further comprising arranging the optical pathways so that a particular point on the stationary optical storage medium where a particular light beam is directed depends on an angular orientation of the spindle about the axis through the stationary dish mirror and on the angle of the light beam redirecting component relative to the axis through the stationary dish mirror.

16. The method of claim 11, further comprising:
providing a stationary convex mirror;
arranging the optical pathways so that the light beams may be directed to the particular points on the stationary optical storage medium via the light beam redirecting mechanism, the stationary convex mirror, and the stationary dish mirror.

17. The method of claim 16,
the stationary convex mirror comprising a collapsed mirror comprising a series of concentric rings;
the stationary dish mirror comprising a collapsed dish mirror comprising a series of concentric reflecting rings;
the method further comprising aiming each of the concentric rings of the stationary convex mirror at a corresponding concentric reflecting ring of the stationary dish mirror.

18. The method of claim 11,
the light beam redirecting mechanism comprising a rotatable spindle and a light beam redirecting component attached to and rotatable with the spindle about the axis through the stationary dish mirror;
the method further comprising arranging at least a portion of the optical pathways so that the light beams travel longitudinally inside of the spindle.

19. An optical data storage apparatus comprising:
a stationary optical storage medium;
directing means for directing light beams to and reflecting them back from particular points on the stationary optical storage medium;
the directing means comprising:
  a stationary dish mirror means for facing an opposing surface of the stationary optical storage medium with point to point correlation between points on the stationary dish mirror means and points on the stationary optical storage medium;
  a means for redirecting light beams that is rotatable about an axis through the stationary dish mirror means.

20. The apparatus of claim 19,
the redirecting means comprising a rotatable spindle and a light beam redirecting component attached to and rotatable with the spindle about the axis through the stationary dish mirror means;
the directing means further comprising a means for adjusting an angle of the light beam redirecting component relative to the axis through the stationary dish mirror means.

* * * * *